Figure 1:
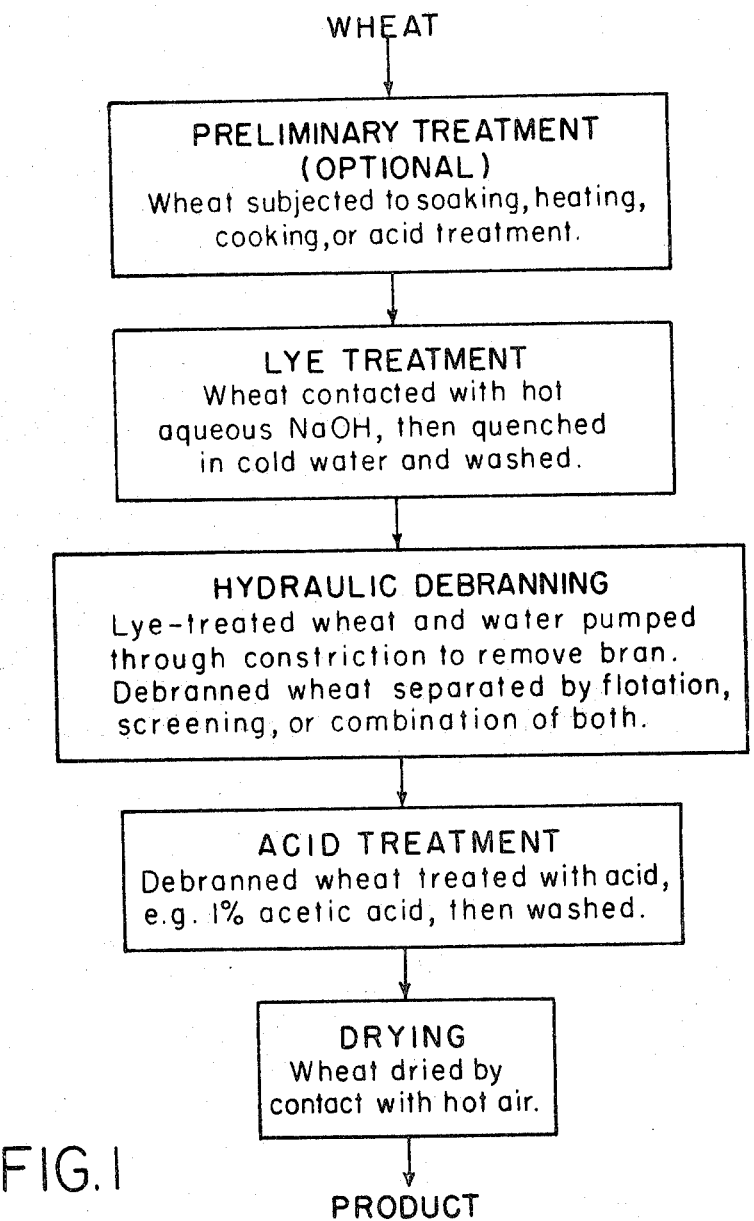

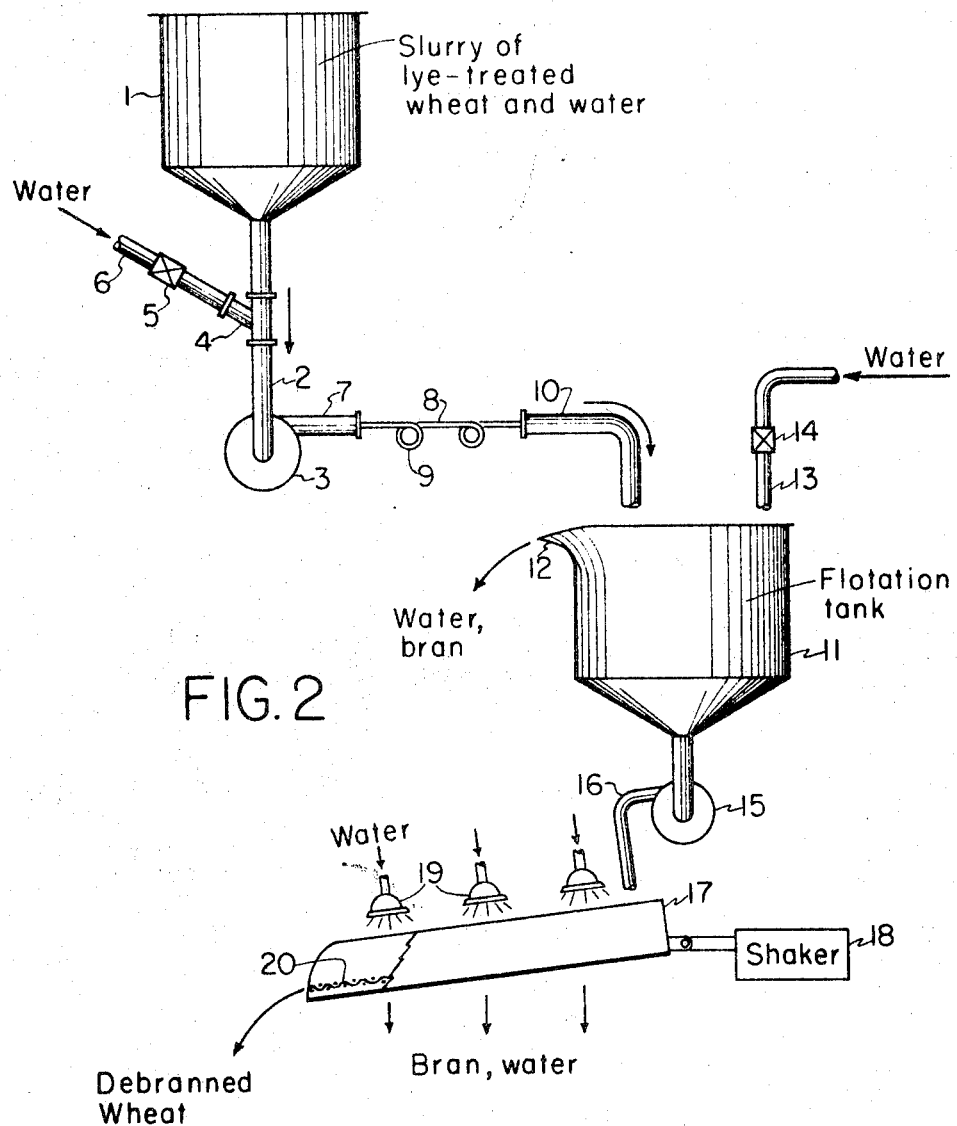

3,264,113
METHODS OF PEELING WHEAT

Edward J. Barta, Albany, and Paul W. Kilpatrick and Arthur I. Morgan, Jr., Berkeley, Calif., assignors to the United States of America as represented by the Secretary of Agriculture
Filed Jan. 8, 1964, Ser. No. 336,603
9 Claims. (Cl. 99—80)

A non-exclusive, irrevocable, royalty-free license in the invention herein described, throughout the world for all purposes of the United States Government, with the power to grant sublicenses for such purposes, is hereby granted to the Government of the United States of America.

This invention relates, in general, to the processing of wheat and has as its primary object the provision of novel processes for preparing peeled wheat products. Further objects and advantages of the invention will be evident from the following description wherein parts and percentages are by weight unless otherwise specified.

In the drawing, FIG. 1 is a flow-sheet illustrating the various steps in the process. FIGURE 2 is a diagram providing details of the hydraulic debranning operation.

It is well known that there exists a large surplus of wheat in the United States, whereas there are food shortages in many parts of the world, particularly in India and the Far East. It might be expected that surplus wheat could be exported to relieve these food shortages. A significant obstacle is, however, that people in the areas in question are not familiar with wheat, nor its culinary uses. Ordinarily, wheat is converted into flour which is then used in the preparation of bread or related bakery products. Although the use of bread as a staple food has an ancient tradition in Europe and countries having a European background, it is little known in the Far East; people in this region, although short on food, are accustomed to a diet of rice and have little interest in bread. As a consequence, a successful program requires conversion of wheat into a product which is adapted for consumption in the form of the grains, as is the case with rice. A particular object of this invention is the provision of processes whereby wheat can be readily converted into products which resemble rice and which have culinary uses similar to those of rice.

The conversion of wheat into products which resemble rice is particularly difficult because of the nature of the bran which surrounds the wheat endosperm. Thus, in wheat the bran exists as a series of six distinct superposed layers over the endosperm. This laminated effect makes the bran as a whole very tough and very resistant to removal. In rice, on the other hand, the bran has no distinct layers but is a structure of fibers in an unorganized, felted arrangement. As a result, the bran of rice is not as tough as wheat bran and is relatively easy to remove from the endosperm. In conventional practice, rice is subjected to milling operations, involving exposing the rice to mechanical rubbing or abrasion, whereby the bran is removed easily and efficiently, that is, with relatively little breakage of kernels or loss of endosperm material. On the other hand, when milling operations are applied to wheat, one attains inadequate bran removal if the milling conditions are mild and excessive losses if the milling conditions are severe. Thus if the conditions of milling are adjusted to be mild, bran tends to be removed mainly from the germ end and the beard end of the wheat grains but little if any bran is removed from the sides of the sides (the equatorial portion, considering the germ and beard ends as the poles). On the other hand, if the conditions of milling are adjusted to get a greater degree of abrasive force, the wheat kernels are broken and a considerable percentage of the endosperm material is ground into fine particles. Such results are useful—and indeed desirable in conventional flour manufacture—but are of no avail for the problem at hand.

In accordance with one feature of the present invention, the problems explained above are obviated by a technique which employs a treatment with sodium hydroxide, followed by a hydraulic debranning operation to remove the bran (loosened by the lye treatment). As a result of such treatment, one obtains uniform bran removal with little breakage of individual kernels and with essentially no loss of endospermic material. Another advantage is that the aleurone layer about the endosperm is retained. The significance of this item is explained as follows: The wheat grain or berry, after threshing to remove the husk, consists of a starchy endosperm, to which is attached the germ, and a bran envelope surrounding the endosperm and germ. This bran envelope consists of a series of six distinct superposed layers or coats. Of particular interest are the innermost, relatively thick layer termed the aleurone and the thin layer above the aleurone termed the seed coat or testa. As noted above, in the practice of this invention the innermost (aleurone) bran layer is retained. In this connection, it is to be realized that the aleurone layer is relatively thick and its removal would entail a considerable drop in yield of product. Moreover, the aleurone layer does not exert any disadvantageous effect on the product and, in fact, it offers advantages. Of interest in this connection are the facts that the aleurone layer is not deeply pigmented; it contains substantial proportions of vitamins, particularly those of the B group; it is relatively permeable to water (thus products retaining this layer can imbibe water readily when prepared for consumption); it acts to minimize cohesion between individual grains when the products are prepared for the table and to prevent disintegration of grains during cooking. In the process of the invention, the testa is removed. This is particularly advantageous because this layer, although it is quite thin, is highly pigmented and is relatively impervious to the penetration of water. Another significant aspect of the invention is that the germ is largely removed from the wheat kernels. This has the benefit that the products keep well—they do not develop rancid odor or taste even when stored for long periods, even at elevated temperatures. On the other hand, products which retain the germ are very susceptible to developing rancidity (because of the unsaturated fats in the germ), particularly when stored at elevated temperatures such as commonly encountered in Asiatic countries.

A detailed explanation of the process outlined above is described in the following paragraphs having reference to FIG. 1 in the annexed drawing.

*Starting material.*—The starting material used in the process of the invention is raw whole-grain wheat that has been previously subjected to conventional cleaning operations as by screening, blowing with air streams, or the like, to remove chaff, foreign seeds, broken kernels, and kernels of abnormal size. As a preliminary step, the cleaned wheat may be also subjected to conventional water-washing. This may be accomplished, for example, by passing the wheat through a reel (a rotating cylindrical screen) while subjecting it to sprays of water to wash away dirt, chaff, etc.

*Preliminary treatment (general).*—As briefly noted above, a critical step in the invention involves contacting the wheat with lye (sodium hydroxide). The raw wheat may be fed directly to this step or it may optionally be subjected to any one of several pretreatment steps. These steps may involve such alternative processes as heating, soaking, cooking, or treatment with acid. Since the lye treatment is conducted at an elevated temperature, it is advantageous that the wheat be hot (about 150–180° F.) when it is mixed with the lye. Under such conditions, the total time for the lye treatment is reduced and the possibility of such undesirable effects as non-uniform bran loosening, distortion or rupture of kernels, or degradation of vitamins or other valuable nutrients by the lye is minimized. Consequently, the preferred modifications of the invention include a step wherein the wheat is heated—as by contact with steam or hot water—prior to contact with the lye. The heating may be conducted under such conditions as to primarily raise the temperature of the wheat or to actually cook the wheat, that is, gelatinize the starch in the endosperm. Another advantage of such preliminary heating or cooking is that the end product will exhibit a shorter cooking time. Thus the preliminary treatment can be varied—for example, as to temperature and time—to effect a greater or lesser reduction in cooking time of the end product, as may be desired. A further advantage is that such preliminary treatment is believed to cause a diffusion of vitamins, particularly water-soluble vitamins, such as thiamine, from the bran layers on the germ into the endosperm. In another alternative form of the pretreatment, the heating is carried out in water acidified to a pH of about 2 to 5.5, whereby an especially desirable degree of diffusion of vitamins into the endosperm is attained. Typical ways in which the pretreatment may be effectuated are disclosed in detail below.

*Preliminary treatment (heating).*—In a preferred embodiment of the invention, the heating is accomplished by contact with steam. As an example, the wheat is passed through a conventional food blancher wherein it is contacted with steam (at 212° F.) issuing from nozzles. The throughput of wheat, amount of steam, and time of residence in the blancher are correlated so that the wheat is brought up to about 180° F. The wheat, while still hot, is then transferred to the lye treatment. In another modification of the invention the heating is accomplished in hot water. As an example, the wheat is fed into a trough, U-shaped in cross-section, provided with a screw, and filled with hot water. Heating jackets are provided to maintain the water at the exit end of the trough at about 180° F.; generally, the water at the feed end is kept at a lower temperature, for example, about 135° F., thus to provide a progressive heating of the wheat. Such progressive heating is especially desirable to avoid rupture or distortion of the wheat kernels. It is evident that as the wheat is moved through the trough it is brought up to a temperature of about 180° F. Following the treatment with hot water, the grain is preferably tempered, that is, it is held or aged so that the moisture in the grains can equilibrate. Such equilibration is desirable as preventing rupture or distortion of the grains in subsequent processing. Generally, the tempering is accomplished by holding the grain while hot, i.e., at about 165–185° F., for a period of about 10 to 30 minutes. The wheat which has thus been heated in water, with or without the tempering treatment, is transferred while hot to the lye treatment.

*Preliminary treatment (cooking).*—In another modification of the pretreatment, the wheat—after heating in hot water and tempering as described above—is cooked. The point of this cooking is to provide a pre-cooked end product which can be prepared for the table in an especially short time. The cooking step is carried out by contacting the grain, still hot from the tempering, with steam at atmospheric pressure. As an example, the wheat may be cooked in a conventional food blancher which includes an endless perforated belt for transporting the wheat through a housing wherein it is exposed to contact with steam (at 212° F.). The perforated belt also has the important function of providing continuous draining of the wheat during the steam treatment, whereby rupture of the grains is prevented. Generally, the conditions of operation, such as the throughput of wheat, amount of steam, time of residence in the system, etc., are correlated so that the wheat is cooked; that is, the starch in the grains is gelatinized. This will usually involve subjecting the grain to the steam at atmospheric pressure for a period of 15 to 20 minutes. The cooked wheat, while still hot, is then transferred to the lye treatment.

*Preliminary treatment (with acid).*—In this modification of the pretreatment, the raw wheat is contacted with an aqueous solution of a non-toxic acid such as sulphuric, phosphoric, citric, acetic, etc. The acid is used in an amount to provide a solution with a pH of about 2 to 5. Generally, acetic acid is preferred and is used in a concentration of about 1%. The acid solution may also contain an acidic buffer, for example, sodium acetate. Preferably, the acid is applied in conjunction with any of the heating or cooking steps previously described to attain concomitant acid treatment and heating (or cooking). Typical ways of carrying out these treatments are given below. The wheat is mixed with at least sufficient acid solution to coat the surfaces of the kernels and then the wheat is contacted with steam to bring its temperature up to about 180° F. Another plan is to immerse the wheat in an excess of the acid solution and heat the solution to about 180° F. Typically, the heating procedure in hot water, described in detail above, may be applied but substituting the acid solution for the water. Tempering may be applied to the acid-treated hot wheat, as with the other heating procedures explained above, to equilibrate moisture content and relieve internal stresses in the kernels. Also, cooking in steam, as described above, may be applied to any of the products of the acid treatment if the aim is to attain an end product of especially short cooking time. The advantage of the acid treatment, particularly in conjunction with heating or cooking, is that it is believed to enhance the diffusion of vitamins from the exterior portions of the kernels into the endosperm.

*Lye treatment.*—In this step the wheat—in its original state or previously subjected to any of the preliminary treatments set forth above—is contacted with aqueous sodium hydroxide at an elevated temperature, i.e., about 150–180° F. The concentration of NaOH in the solution is generally 15 to 25%, preferably 20%, and the solution is applied in an amount sufficient to coat or wet the surfaces of the wheat kernels. This amount will generally be on the order of 10 to 20 parts of solution per 100 parts of wheat. To avoid any cooling effect, the lye solution is applied hot, that is, at about 150–180° F. During the course of the treatment it is preferred to apply mixing to spread the lye solution uniformly over the grains, thus to promote uniform loosening of the bran. During the mixing the system may be heated by conventional steam coils or by direct addition of steam. The lye solution is allowed to act until the bran slips readily off the grains. In any particular case this can be readily determined by removing a sample of the wheat, rinsing it in water and testing the adherence of the bran with the fingers. When the bran slips readily off the kernels in long shreds, the process is terminated. In general, the action of the sodium hydroxide is complete in about 2 to 10 minutes. In cases where the lye solution contains 20% NaOH and the procedure is carried out at 180° F., the bran loosening is completed in about 3 minutes. When the bran has been loosened, the action of the lye is terminated or short-stopped by a quenching step, i.e., mixing the hot, lye-treated wheat with an excess of cold water. Detached bran, soluble materials produced by the lye action, etc. are then removed by washing the wheat while supported on a perforated surface, for example, a shaker screen, with a spray of cold water. The lye-treated wheat is then transferred to the next step.

*Hydraulic debranning.*—At this point, the bran has been loosened by the lye treatment but it is still largely in place on the kernels. Of course, if it were a matter of a few kernels, the bran could be removed easily by any means such as brushing or rubbing on a screen. However, in treating substantial quantities of wheat such procedures are completely impracticable: the bran, as it is rubbed off, breaks into fine shreds which completely gum up the brushes or screens so that after a short interval of processing the production line comes to a standstill while the device is cleaned. A critical factor in the process of the invention, and one that makes it useful in the continuous processing of large quantities of wheat, is the application of a hydraulic debranning system. This system involves forcing a slurry of the wheat and water through a constriction. As the material passes through this constriction, the flow becomes very turbulent and the bran is sheared off the kernels in relatively large shreds. The resulting mixture of debranned kernels, water, and bran shreds is then treated to separate the desired component—the debranned wheat. This separation may be achieved in various ways, for example, by flotation, by screening, or a combination of both.

Reference is now made to FIG. 2 which discloses a system for conducting the hydraulic debranning and separation of the debranned wheat from the bran, debris, water, etc. The system includes tank 1 for holding a slurry of water and lye-treated wheat. A pipe 2 connected to the base of tank 1 leads to the intake of pump 3. Wye 4, valve 5, and pipe 6 are provided for introduction of additional water into the system. The outlet 7 of pump 3 is connected to a section of pipe 8 of reduced diameter which is formed into one or more loops 9. Pipe 8, together with its looped arrangements 9, constitutes the constriction. The exit end of pipe 8 is connected to a pipe 10 of larger diameter which leads to flotation tank 11. An overflow lip 12 is provided at the top of tank 11. Pipe 13 and valve 14 are provided for adding additional water to tank 11. A pump 15 and conduit 16 are provided at the base of tank 11 for pumping debranned wheat onto shaker-washer 17. This is a conventional device, provided with a shaker mechanism 18 for oscillating screen 20. Spray heads 19 are provided for spraying water onto the wheat. Screen 20 may conveniently be wire cloth containing 8 meshes per inch.

In operation, water and lye-treated wheat are mixed in tank 1. Pump 3 is then activated and water is introduced into pipe 2 (from pipe 6) to prime the pump system. As the system fills with water, the wheat-water slurry is drawn from tank 1, forced through pipe 8 and its loops 9, whereby the loosened bran is stripped off the kernels by the shearing action of the extreme turbulence. The slurry then discharges into flotation tank 11, the wheat settling to the bottom. Additional water, from pipe 13, is added to maintain the level to the top of lip 12 and the excess water carrying floating bran particles is discharged over lip 12. The wheat now largely free of adhering bran is pumped into shaker-washer 17 wherein remaining bran particles and water pass through screen 20. The debranned wheat is discharged from the lower end of the shaker screen 20.

In the preferred embodiment of the invention, the slurry after passing through the constriction is subjected to both flotation and screening whereby particularly good results are obtained, i.e., by conducting the preliminary flotation, plugging of the interstices in the screen is completely obviated. However, the system can be operated with direct screening, that is, with omission of the flotation step.

The hydraulic debranning operation may be conducted with various types of apparatus, the critical point being to force the slurry of wheat and water through a constriction. This constriction may take many forms, for example, it may be an orifice; a section of pipe fabricated into zigzag shape; a pipe provided with internal obstructions such as knobs or baffles; a pipe bent into loops, offsets, wave patterns, etc. Another plan is to pump the slurry through a second pump connected in reverse direction in the line. In such an arrangement, it is obvious that the first pump must be powerful enough to overcome the action of the second pump. In sum, one may use any of the above arrangements or their equivalents which provide the flow with a degree of turbulence high enough to cause shearing of the loosened bran from the lye-treated wheat but not so high as to damage the bran-free kernels.

*Acid treatment (bleaching).*—The wheat, issuing from the debranning step, has a pale yellow-green color and it is desirable to correct this color deficiency. We have found that a treatment of the wheat with dilute acid bleaches this coloration, producing an essentially white product. Although any non-toxic acid can be used in this treatment such as sulphuric, citric, phosphoric, etc., we prefer to use acetic acid. It has the advantage of volatility so that any excess left in or on the wheat is removed in the subsequent drying operation. The acid is used in dilute concentration—about 1%—and the wheat is kept immersed in an excess of the acid solution long enough for the desired bleaching to take place. Preferably the acid solution is warmed, for example, to a temperature of 100 to 150° F., to hasten the bleaching action. Generally, using a 1% solution of acetic acid at a temperature of 120–130° F., the desired color is attained with an immersion time of about 10 minutes. Following the acid treatment, the wheat is washed with water and is forwarded to the drying step.

*Drying.*—In this final step of the process the debranned wheat is dried. This can be accomplished with any of the conventional driers used with grain products. For example, a tray drier can be used where the wheat spread on screens is exposed to a cross-flow or through-flow of air at about 150–160° F. Another example is the use of a column-type drier wherein the wheat cascades over a baffle arrangement while exposed to an upward current of hot air. If desired, the drying may be conducted in stages, that is, a portion of the moisture content is removed in one stage, the material allowed to stand to permit equilibration of moisture and further drying and equilibration are repeated as necessary. Such step-wise drying is generally preferable as avoiding internal strains and thus prevents any rupture of individual kernels. In any event, the drying is continued until the product contains about 10% moisture.

The resulting product resembles rice in appearance and cooking quality. It consists of unbroken kernels of wheat with the bran essentially completely removed (except for the desired innermost aleurone layer), essentially white in color, and with about 20% to 100% of the germ removed, depending on the extent of the pretreatment applied. It is evident that where more severe conditions are applied in the pretreatment, a greater proportion of germ will be removed. To prepare the product for the table, it is added to water and cooked for about 15 to 30 minutes. Because the wheat berry characteristically has a longitudinal crease within which the bran is infolded, the products retain this "in-crease" bran. This is particularly the case with those products wherein no preliminary treatment is used or where the preliminary treatment does not involve an actual cooking of the kernels. This portion of the bran is, however, an insignificant part of the total bran and offers no problem in cooking or eating. Moreover, in the modification of the invention wherein the preliminary treatment involves a cooking operation, this portion of the bran is absent, as well as the rest. Thus, in this product the crease is opened somewhat and the "in-crease" bran removed. Also, the products of this modification have a somewhat translucent appearance, whereas those prepared without a cooking step are essentially opaque.

Generally, the drying step—as explained above—is conducted by contacting the wet debranned kernels with air at a temperature on the order of 150–160° F., thus to attain dehydration without affecting the size of the kernels. If desired, however, the drying can be conducted under conditions to attain concomitant drying and expansion of the individual kernels. Such results can be achieved, for example, by applying air at higher temperatures, for example, up to 350° or 400° F., and at high flow velocities. Under such conditions, internal pressures of steam are created within the kernels which expand the kernels, i.e., increase their volume. By suitable choice of conditions, one may obtain a limited expansion, for example, a volume of 1.5 to 2.5 times that of the original kernels or a greater expansion to produce a very low density, puffed product.

The invention is further demonstrated by the following illustrative examples:

EXAMPLE 1

*(Preliminary treatment: heating with steam)*

A batch of Kansas hard red winter wheat was divided into 25-lb. lots, each lot being treated as follows: The wheat was loaded onto perforated trays which were passed through a blancher in which they were contacted with steam at 212° F. for 2 minutes.

The wheat, while still hot from the blancher, was fed into a ribbon mixer, together with 4.6 lbs. of hot (180° F.) 20% NaOH solution. The wheat and lye solution were mixed for 3 minutes. During mixing, steam was introduced to keep the mixture at 180° F. The hot mixture was then dumped into excess cold water and the lye-treated wheat washed on a shaker-washer.

The lye-treated wheat was slurried with an equal weight of water and the slurry was pumped through a system as shown in FIG. 2. The pump outlet conduit 7 had an internal diameter of 1½" and the constriction 8 was an 18" length of pipe, ¼" internal diameter, bent into two loops. Pump 3 delivered 13 gallons per minute against 20 pounds per square inch pressure. The discharge pipe 10 was led directly to shaker-washer 17. The product discharging from the lower end of screen 20 was completely free from bran.

The debranned wheat was fed into a tank containing 25 lbs. of 0.75% acetic acid solution. The wheat was allowed to remain in the acetic acid at 120–130° F. for 15 minutes, then removed and washed on a shaker-washer.

The wheat was then dried in a rice bin dryer with an upward flow of air at 160° F.

The product was unbroken kernels of wheat, essentially white in color. The bran was completely removed except for the desired innermost aleurone layer. The product had a cooking time of 30 minutes.

Analysis: | Percent
---|---
Total solids | 92.1
Nitrogen | 2.0
Fat | 1.77
Fiber | 0.93
Ash | 1.42

The bulk density was 49 lbs./cu. ft.

EXAMPLE 2

*(Preliminary treatment: heating in water)*

The same type of wheat was used as in Example 1. One hundred pounds of the wheat was placed in a vessel and covered with water at 135° F. The vessel was heated to raise the temperature of the mixture to 155° F. over a 30-minute period, then to raise it to 180° F. over another 30-minute period. The wheat was removed from the vessel, drained, and held (tempered) at 180° F. for 30 minutes.

The wheat, while still hot from the tempering step, was fed into a ribbon mixer, together with hot (180° F.) 20% NaOH solution, using 7.3 lbs. of solution per 40 lbs. of wheat. The wheat and lye solution were mixed for 4 minutes. During the mixing, steam was added to keep the mixture at 180° F. The hot mixture was then dumped into an excess of cold water and the lye-treated wheat washed on a shaker-washer.

The lye-treated wheat was subjected to hydraulic debranning and separation; treated with dilute acetic acid; and dried—all as described in Example 1.

The product was unbroken kernels of wheat, essentially white in color. The bran was completely removed except for the desired innermost (aleurone) layer. About 60% of the germ was removed. The product had a cooking time of 30 minutes.

Analysis: | Percent
---|---
Total solids | 94.5
Nitrogen | 2.07
Fat | 1.24
Fiber | 0.6
Ash | 1.5

The bulk density was 40 lbs./cu. ft.

EXAMPLE 3

*(Preliminary treatment: cooking)*

A batch of hard red winter wheat was placed in a vessel and covered with water at 135° F. The vessel was heated to raise the temperature of the mixture to 155° F. over a 30-minute period, then to raise it to 180° F. over another 30-minute period. The wheat was removed from the vessel, drained, and held (tempered) at 180° F. for 30 minutes. The wheat was then loaded onto perforated trays which were passed through a blancher wherein they were contacted with steam at 212° F. for 15 minutes.

The wheat, still hot from the blancher, was fed into a ribbon mixer, together with 20% NaOH solution (7.3 lbs. of solution per 40 lbs. cooked wheat), and mixed for 3 minutes. The hot mixture was then dumped into excess cold water and the lye-treated wheat washed on a shaker-washer.

The lye-treated wheat was then subjected to hydraulic debranning and separation; treated with dilute acetic acid; and dried—all as described in Example 1.

The product was unbroken kernels of wheat, essentially white and translucent, and essentially free from germ. The bran, including the "in-crease" bran, was completely removed except for the desired innermost aleurone layer. The product had a cooking time of 15 minutes. Bulk density was 31 lbs./cu. ft.

Analysis: | Percent
---|---
Total solids | 95.2
Nitrogen | 2.07
Fat | 0.94
Fiber | 0.72
Ash | 1.60

EXAMPLE 4

*(Preliminary treatment with acid)*

Forty pounds of hard red winter wheat and 5 lbs. of an aqueous solution of 1% acetic acid and 1% sodium acetate (pH 4.3) was mixed in a ribbon mixer for 3 minutes. The wheat was loaded onto perforated trays (2.5 lbs. per sq. ft.) and heated with saturated steam (212° F.) in a blancher for 2 minutes. The hot wheat was then added to 40 lbs. of an aqueous solution of 1% acetic acid and 1% sodium acetate at 180° F. and maintained at 180–185° F. for 10 minutes. After draining off excess liquid, the hot wheat was tempered for ½ hour, trayed, and heated in saturated steam at 212° F. for 3 minutes.

The hot wheat plus hot (180° F.) lye solution (25% NaOH, 4.7 lbs. NaOH per 100 lbs. original wheat) were mixed 3 minutes in a ribbon mixer, then quenched in cold water and washed.

The lye-treated wheat was subjected to hydraulic debranning and the debranned wheat separated from the bran, debris, etc. as described in Example 1. The acid treatment was also as in Example 1 except that the acid solution contained 1% acetic acid plus 1% sodium acetate. The acid treatment was continued for 10 minutes at 120–130° F., the wheat washed and then dried with air at 160° F. The product showed a 70% retention of the original vitamin $B_1$.

Having thus described the invention, what is claimed is:

1. A method for peeling wheat which comprises mixing wheat with an aqueous solution containing about 15 to 25% NaOH, continuing the mixing at a temperature of about 150–180° F. until the bran can be slipped readily off the kernels, then washing the treated wheat, and pumping a slurry of the treated wheat and water through a constriction providing a zone of turbulent flow to remove the loosened bran from the wheat kernels while retaining the aleurone layer thereon.

2. The process of claim 1 wherein the wheat, prior to contact with the NaOH solution, is heated with steam to a temperature of about 180° F.

3. The process of claim 1 wherein the wheat, prior to contact with the NaOH solution, is heated in water to a temperature of about 180° F.

4. The process of claim 1 wherein the wheat, prior to contact with the NaOH solution, is subjected to cooking to gelatinize the starch therein.

5. The process of claim 1 wherein the wheat, prior to contact with the NaOH solution, is heated in the presence of an aqueous acidic medium having a pH of about 2 to 5.5.

6. The process of claim 1 wherein the wheat, following its pumping through a constriction, immersed in a dilute aqueous solution of a non-toxic acid for a period long enough to bleach the wheat.

7. The process of claim 1 wherein the wheat, following its pumping through the constriction, is immersed in a dilute aqueous solution of acetic acid for a period long enough to bleach the wheat.

8. A process for peeling wheat which comprises contacting the wheat with hot aqueous sodium hydroxide in a concentration of about 15 to 25% to loosen the bran on the wheat kernels, washing the treated wheat, pumping a slurry of the treated wheat and water through a constriction providing a zone of turbulent flow to strip the loosened bran from the wheat kernels while retaining the aleurone layer thereon, and separating the stripped bran and water from the wheat kernels.

9. A process for peeling wheat which comprises contacting the wheat with hot aqueous sodium hydroxide in a concentration of about 15 to 25% to loosen the bran on the wheat kernels, washing the treated wheat, pumping a slurry of the treated wheat and water through a constriction providing a zone of turbulent flow to strip the loosened bran from the wheat kernels while retaining the aleurone layer thereon, flowing the slurry into a quiescent zone to promote flotation of the bran and sinking of the debranned wheat, and separately removing the debranned wheat and bran from said zone.

References Cited by the Examiner

UNITED STATES PATENTS

| | | | |
|---|---|---|---|
| 288,669 | 11/1883 | Schwarzwaelder. | |
| 563,860 | 7/1896 | Hopkins | 99—80 |
| 2,232,697 | 2/1941 | Earle | 99—80 |
| 2,358,251 | 9/1944 | Huzenlaub et al. | 99—80 |
| 2,393,975 | 2/1946 | Daman | 99—80 X |
| 2,472,971 | 6/1949 | Hansen | 146—235 X |
| 2,530,272 | 11/1950 | Thrasher | 99—80 X |
| 2,616,819 | 11/1952 | Ford | 146—226 X |

A. LOUIS MONACELL, *Primary Examiner.*

RAYMOND N. JONES, *Examiner.*